United States Patent [19]

Tanaka

[11] Patent Number: 4,504,261
[45] Date of Patent: Mar. 12, 1985

[54] METHOD OF MAKING A PAPER TUBE

[75] Inventor: Junkichi Tanaka, Yao, Japan

[73] Assignee: Tanaka Shikan Kabushiki Kaisha, Osaka, Japan

[21] Appl. No.: 332,259

[22] Filed: Dec. 18, 1981

[51] Int. Cl.³ .............................................. B31C 11/04
[52] U.S. Cl. .................................... 493/273; 493/274; 493/291; 493/326
[58] Field of Search ................ 493/273, 272, 271, 274, 493/291, 287, 326, 327, 332, 331, 328, 299

[56] References Cited

U.S. PATENT DOCUMENTS

| | | | |
|---|---|---|---|
| 1,623,965 | 4/1927 | Marshall | 493/291 X |
| 2,664,793 | 1/1954 | Dunlap | 493/271 |
| 2,785,700 | 3/1957 | Yovanovich | 493/291 X |
| 2,981,975 | 5/1961 | Steierman | 493/271 X |
| 3,430,543 | 3/1969 | Cunningham | 493/291 X |
| 3,580,146 | 5/1971 | Biancamaria | 493/271 |

FOREIGN PATENT DOCUMENTS 55-17009  2/1980  Japan.

Primary Examiner—James F. Coan
Attorney, Agent, or Firm—Armstrong, Nikaido, Marmelstein & Kubovcik

[57] ABSTRACT

A method of manufacturing spiral winding paper tube, the surface of which is ground, coated with colored synthetic resin and ground again after coating. By this way, paper tube of any length, with variously colored and very smooth surface of appropriate hardness, will be gained continuously and economically.

2 Claims, 8 Drawing Figures

METHOD OF MAKING A PAPER TUBE

BRIEF SUMMARY OF THE INVENTION

This invention relates to improvements in paper tubes and more particularly in paper tubes for winding plastic film for magnetic tape which is required to have high-fidelity such as for audio tape or video tape.

Paper tubes of this kinds of prior art are manufactured, by, as shown in Showa 55-17009 of Published Utility Model Gazette in Japan, winding convolutely synthetic resin saturating paper several times on the surface of a paper tube of moderate length, making the surface of it smooth, by way of heating press or other, cutting both sides of it in specified length. However tubes of prior art have several weak points:

(1) The length of finished paper tubes are resricted by the width of synthetic resin saturating paper. Namely if the width of synthetic resin saturating paper is one foot, the length of finished paper tubes are shorter than one foot. In other words, for each finished paper tubes of specified length, synthetic resin saturating paper with a little longer width has to be prepared.

(2) Whereas spiral winding is done continuously, convolute winding has to be done one by one inefficiently.

(3) In case of convolute winding, it is generally difficult technically, to wind wide paper uniformly on paper tube after applying binding agent. And if it is done, smooth surface will not be gained because of bad binding. Accordingly, in order to gain smooth surface paper tubes, synthetic resin saturating paper with relatively shorter width has to be wound. In this way, efficiency is bad, and moreover, long finished tubes with smooth surface are hardly manufactured.

(4) If synthetic resin saturating paper is dryed by hot air in short time, synthetic resin becomes hard, and the paper can not be wound. So, synthetic resin saturating paper has to be dryed naturally with long time and high cost.

(5) When synthetic resin saturating paper of usual thickness is wound convolutely for finishing paper tube, uneveness will occur and smooth surface will not be gained.

Therefore the object of the invention is to provide a paper tube for winding plastic film for magnetic tape, which is required to have high-fidelity such as for audio tape or video tape, efficiently and economically.

Figure 1:
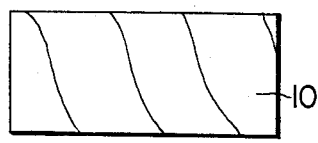
FIG. 1 is a view in side elevation of a paper tube before synthetic resin is coated.

10 ... tape type paper
11 ... coated film of synthetic resin
12 ... base of tape type paper
13 ... surface of tape type paper
14 ... slope of tape type paper
15 ... grinding before coating
16 ... coating
17 ... drying
18 ... grinding after coating and drying

DETAILED DESCRIPTION

Figure 4:
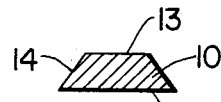
FIG. 4 is a view in transverse cross-section of tape type paper, the section of which is a trapezoid in which the base is longer than the upper line.
Figure 2:
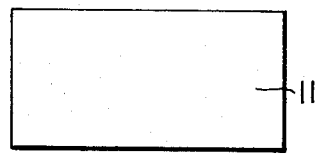
FIG. 2 is a view in side elevation of a paper tube after synthetic resin is coated.
Figure 5:
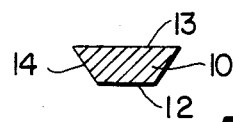
FIG. 5 is a view in transverse cross-section of tape type paper, the section of which is an adverse trapezoid in which the base is shorter than the upper line.
Figure 6:
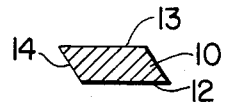
FIG. 6 is a view in transverse cross-section of tape type paper, the section of which is a parallelogram.
Figure 3:
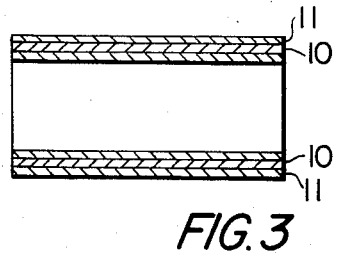
FIG. 3 is a view in longitudinal cross-section of a paper tube after synthetic resin is coated.
Figure 7:
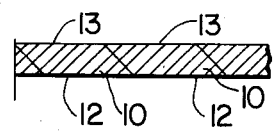
FIG. 7 is a view in longitudinal cross-section of a part of the very outer side of a paper tube without synthetic resin coating (hereinafter called the simple tube).

The paper tube of this device eliminates the said weak points and has several strong points:

In the drawings, the base tube is made, by winding paper 10, the transverse section of which is either trapezoid, adverse trapezoid or parallelogram as shown in FIGS. 4, 5 and 6, on the very outer side of a spiral wound paper tube as shown in FIG. 7.

When paper 10 of FIG. 4, the transverse section of which is trapezoid, is used, binding agent should be applied on base 12, the edge of 10 should be pressed and the paper should be wound so that slope 14 of a paper is adjacent to the horizontal surface 13 of a next paper. In this case, the edge of base 12 is adjacent to slope 14 of next paper.

When paper 10 of FIG. 5, the transverse section of which is adverse trapezoid, is used, binding agent should be applied on base 12, the edge of 10 should be pressed and the paper should be wound surface 13 of a paper and surface 13 of next paper should be horizontal. In this case, slope 14 is attached to the edge of surface 13 of next paper.

When paper 10 of FIG. 6, the transverse section of which is parallelogram, is used, binding agent should be applied on base 12 and the paper should be wound so that surface 13 of a paper and surface 13 of next paper should be horizontal, and so that there should be no space between slope 14 of a paper and slope 14 of next paper. In this case, slope 14 is just attached to slope 14 of next paper.

When the very outer part of paper is not wound in spiral, but is wound convolutely by usual paper, the transverse section of which is rectangle, space will occur between papers, and even if synthetic resin is coated, a slight uneveness will appear on the surface of paper, and smoothness will lack. So, a suitable paper tube for winding high-fidelity required plastic film will not be gained.

Figure 8:
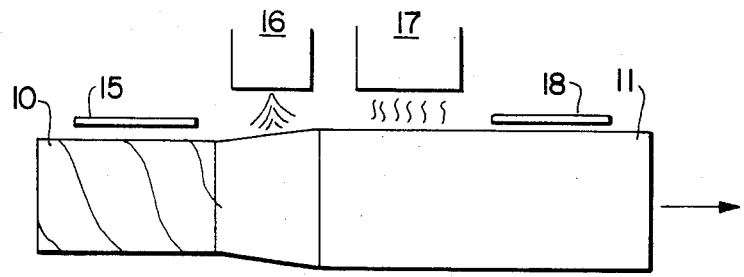
FIG. 8 is a flow diagram, which explains how to grind and coat the surface of the simple tube, dry and grind again coated tube.

In FIG. 8, base tube is turned around its axis, and moves the arrow head direction. The surface of the base tube is ground at 15, coated with synthetic resin of a thickness of over 90 microns at 16, dryed at 17, ground again at 18, and the tube is finished so that the thickness of synthetic resin is over 50 microns.

The effects of this device are:

(1) Since a spiral paper tube is used, it can be manufactured with any length and at low cost.

(2) Since a spiral paper tube is used, it can be wound continuously in an effective manner.

(3) Since a spiral tube is used, it is not necessary to use wide paper, and a paper tube with an even and smooth surface will be produced.

(4) Since a synthetic resin is coated on the surface of the paper tube, a synthetic resin coated paper tube is gained at low cost.

(5) For the same reason as in 4, the process of producing the tube is simple and economic.

(6) Since the surface of tube is ground twice, before coating and after coating, it will be very smooth. In order to enable grinding after coating, the thickness of coating must be at least 90 micron. If it is less than that, a stable smooth film of synthetic resin will not be produced after the last grinding.

(7) By these means a, paper tube with very smooth surface is produced, which is suitable for winding high-fidelity plastic film for magnetic tape such as for audio tape and video tape.

(8) Since a synthetic resin is coated on the surface of paper tube, the kind of synthetic resin can be changed easily. By changing the kinds of synthetic resin, appropriate hardness of surface of tube is provided, and by changing the color of paints or dyes mixed in the synthetic resin, the nature of surfaces of tubes are distinguished by color, and kinds of thickness of films can be shown also.

(9) After using this paper tube, if the surface of it is damaged or becomes dirty, it can be used again by a grinding-coating-grinding process.

What is claimed is:

1. A method of making a paper tube comprising the steps of:
    (a) winding a paper tape in a spiral, said paper tape having a cross-section selected from the group consisting of a parallelogram or a trapezoid, wherein the edges of the turns of the spiral, contact the edges of adjacent turns, the spiral wound paper tape forming a paper tube with contacting adjacent edges;
    (b) grinding the surface of the paper tube to form a smooth surface thereon;
    (c) coating the surface of the paper tube with a synthetic resin;
    (d) drying the resin coating of tube; and
    (e) grinding the resin coated surface of the tube, thereby forming a smooth surface thereon.

2. The method of claim 1 wherein the step of coating the surface of the paper tube comprises coating the surface with a colored synthetic resin.

* * * * *